(12) United States Patent
Kolar et al.

(10) Patent No.: US 6,364,522 B2
(45) Date of Patent: Apr. 2, 2002

(54) BLENDER HAVING USER OPERATED DRINK PROGRAM MODIFYING AND COPYING PROCESSOR

(75) Inventors: David J. Kolar, Streetsboro; Hassan Varghai, Solon, both of OH (US)

(73) Assignee: Vita-Mix Corporation, Cleveland, OH (US)

( * ) Notice: Subject to any disclaimer, the term of this patent is extended or adjusted under 35 U.S.C. 154(b) by 0 days.

(21) Appl. No.: 09/883,882

(22) Filed: Jun. 18, 2001

Related U.S. Application Data

(63) Continuation-in-part of application No. 09/311,104, filed on May 12, 1999.

(51) Int. Cl.⁷ .................................................. B01F 7/02
(52) U.S. Cl. .......................... 366/206; 366/601; 241/36
(58) Field of Search ................................ 366/206, 199, 366/205, 601, 197; 99/348, 325; 365/228; 241/36

(56) References Cited

U.S. PATENT DOCUMENTS

| | | | | |
|---|---|---|---|---|
| 2,955,186 A | * | 10/1960 | Ritter ........................ 200/19.13 |
| 3,299,226 A | * | 1/1967 | Edwards ....................... 366/601 |
| 3,548,280 A | * | 12/1970 | Cockroft ...................... 366/601 |
| 3,731,059 A | * | 5/1973 | Wilson ........................ 235/61 A |
| 3,943,421 A | * | 3/1976 | Shibata et al. ............... 366/601 |
| 3,951,351 A | * | 4/1976 | Ernster et al. ............... 366/601 |
| 4,568,193 A | * | 2/1986 | Contri et al. ................ 366/206 |
| 4,686,356 A | | 8/1987 | Ueda et al. ................... 99/325 |
| 4,762,057 A | | 8/1988 | Hirota et al. .................. 99/348 |
| 4,822,172 A | | 4/1989 | Stottman ...................... 366/601 |
| 4,893,942 A | * | 1/1990 | Stottmann ..................... 366/601 |
| 4,968,864 A | | 11/1990 | Doi et al. ...................... 99/325 |
| 5,156,867 A | * | 10/1992 | Leuthold et al. ............... 366/601 |
| 5,267,211 A | | 11/1993 | Kobayashi et al. ............. 365/228 |
| 5,267,790 A | | 12/1993 | Sutherland et al. ............ 366/601 |
| 5,316,382 A | * | 5/1994 | Penaranda et al. ............ 366/601 |
| 5,347,205 A | | 9/1994 | Piland ......................... 366/206 |
| 5,363,746 A | * | 11/1994 | Gordon ........................ 366/601 |
| 5,392,695 A | | 2/1995 | Junkel .......................... 99/348 |
| 5,531,153 A | | 7/1996 | Maruyama et al. ............. 99/601 |
| 5,556,198 A | | 9/1996 | Dickson, Jr. et al. .......... 366/601 |
| 5,562,020 A | | 10/1996 | Shigeshiro ..................... 99/348 |
| 5,577,735 A | | 11/1996 | Reed et al. .................... 463/40 |
| 5,605,090 A | | 2/1997 | Mantani et al. ................ 99/348 |
| 5,660,467 A | * | 8/1997 | Mineo et al. .................. 366/279 |
| 5,768,978 A | * | 6/1998 | Dorner et al. ................. 366/601 |
| 5,829,341 A | | 11/1998 | Lin ............................. 366/601 |
| 5,839,356 A | | 11/1998 | Dornbush et al. .............. 99/348 |
| 5,967,021 A | | 10/1999 | Yung ............................ 99/348 |

OTHER PUBLICATIONS

Gaggia Española S.A. "ipanema" brochure (undated).
Gaggia Española S.A. "Copacabana" brochure (undated).
Gaggia Española S.A. "ipanema—Space-Saving High Technology" brochure (undated).

\* cited by examiner

*Primary Examiner*—Tony G. Soohoo
(74) *Attorney, Agent, or Firm*—Renner, Kenner, Greive, Bobak, Taylor & Weber

(57) ABSTRACT

A programmable drink blender (20) includes a blender motor (25), a user interface and display (24) having a plurality of buttons (30) for entry of various user selections, a base memory (70) storing a blend program, a key card (50) having a memory storing a blend program, a socket (68) receiving the key card (50), and a processor (62) for controlling blender motor (25) in accordance with the blend program. The blend program has a plurality of operating segments with variable blend program operating characteristics. The user presses selected buttons (30) to cause processor (62) to modify and save any desired characteristic of the blend program. The user also presses selected buttons (30) to cause processor (62) to copy the blend program from memory in key card (50) to base memory (70), and vice versa.

21 Claims, 9 Drawing Sheets

BLENDER HAVING USER OPERATED DRINK PROGRAM MODIFYING AND COPYING PROCESSOR

CROSS REFERENCE TO RELATED APPLICATION

This application is a continuation-in-part of U.S. patent application Ser. No. 09/311,104 filed May 12, 1999.

TECHNICAL FIELD

The present invention relates in general to appliances used to process food and drinks. More particularly, the present invention pertains to food and drink blenders having a plurality of programmable blend operations selectively actuated by the user. More specifically, the present invention relates to such blenders where the programmable blend operations may be loaded, changed and copied by the user without the use of an external device such as a computer.

BACKGROUND ART

Appliances to facilitate the processing of food and drink ingredients have become ubiquitous in both commercial and residential settings. Such appliances are particularly useful where there are a variety of operations to be performed repeatedly with accuracy and precision, such as with the blending of drinks in commercial establishments like bars and restaurants.

Originally drink blenders required the user to manually start and stop the blender motor, leaving the quality of the blend and resulting drink, and the consistency of the mixture, to the skill of the user and chance. Moreover, the motor included within these blenders had a single operating speed that was too fast for some blends and too slow for others, making quality blends and consistent mixtures even more difficult for the user to manually achieve.

User selectable motor speed controls and timers were incorporated into blenders to facilitate greater consistency from drink to drink, but the user had to reset the controls each time a different kind of drink was to be made, and most times a different ingredient was added.

More recently, digital electronics has made it feasible for blenders to include memory in which is stored the different motor speeds and operating intervals required for making a plurality of kinds of drinks. These digitally controlled blenders kept user control activity to a minimum by furnishing a separate button for each kind of drink whose program (called a "drink program" or "blend program") was stored in memory. A user simply pressed the button corresponding to the desired kind of drink, and pushed a start button to commence blending of a drink. The resulting drinks were the same no matter who made it, or when or where it was made. The fast, consistent, reliable and complete mixing performed by these blending units were welcomed by both commercial and residential users.

From time to time changes in user taste or preference, or changes in location of a blender used in commercial food service, has given rise to a desire or need to change a drink program or substitute programming for different kinds of drinks. A like need also might arise from corruption or loss of preprogrammed drink operation stored in memory such as from electrical failure. In the past, modification or replacement of drink programming required that the unit be returned to the manufacturer because disassembly was needed, precluding reprogramming outside the manufacturer's facility (i.e., in the field). A user could not modify or replace one or more drink programs at the user's site.

More recently, however, machines that may allow for a limited extent of program entry by the user may have become commercially available. The models "Copacabana" and "ipanema" from Gaggia Espanola, S. A. of Barcelona Spain are machines for the making of espresso and cappuccino drinks. These machines appear to read information encoded by an external programming device onto a magnetic strip adhered to a plastic card, much the same as an Automated Teller Machine reads information off a credit card. The model "ABC Blender" from the Blendtec division of K-TEC of Orem Utah connects via a serial programming port to an external computer from which drink programs may be entered.

Both the Gaggia Esponola drink machine and the ABC Blender require an external device such as a computer to enter, modify or duplicate the drink programs. Generally, such additional, sometimes specialized equipment is not available to or convenient for the user. As a result, this makes uneconomical and often precludes user modification of existing drink programs and the creation of new drink programs, and prevents distribution of such programs to other blenders at the same or related sites.

SUMMARY OF THE INVENTION

It is, therefore, an object of the present invention to provide an appliance for processing of food and drink ingredients having a plurality of preprogrammable blend programs, in which the blend programs allow programming for multiple ingredient blends requiring a plurality of intervals of motor operation at different velocities and accelerations.

It is another object of the present invention to provide an appliance, as set forth above, in which the blend programs may be changed by the user, and the modified blend programs saved to nonvolatile memory, using only the appliance itself.

It is still another object of the present invention to provide an appliance, as set forth above, in which user changes to blend programs may include modification of any drink mix characteristic or the ice content of any drink including ice, using only the appliance itself.

It is yet another object of the present invention to provide an appliance, as set forth above, in which entirely new blend programs may be created by the user, and the new blend programs saved to nonvolatile memory, using only the appliance itself.

It is a further object of the present invention to provide an appliance, as set forth above, in which the user may duplicate the blend programs for use in other blenders or as backup, using only the appliance itself.

It is still a further object of the present invention to provide an appliance, as set forth above, in which the user may copy selected blend programs to a transfer mechanism such as physical media, using only the appliance itself.

These and other objects and advantages of the present invention over existing prior art forms will become more apparent and fully understood from the following description in conjunction with the accompanying drawings.

In general, a programmable blender for executing a blend program includes a blending assembly for blending ingredients, memory including a first blend program having a plurality of operating segments with variable blend program operating characteristics, input means for user selection of a first operating characteristic to be modified and the modification magnitude, and a processor. The processor receives the blend program from the memory and the user selection from the input means, modifies the first operating characteristic in accordance with the user selection, and controls operation of the blending assembly in accordance with the modified blend program.

A blender for executing a blend program includes a blending assembly for blending ingredients, a first memory resident in the blender for storing a blend program, a second memory in operative association with the blender for storing the blend program, and a processor resident in the blender receiving the blend program and selectively copying the blend program from the first memory to the second memory and from the second memory to the first memory.

PREFERRED EMBODIMENT FOR CARRYING OUT THE INVENTION

Figure 1:
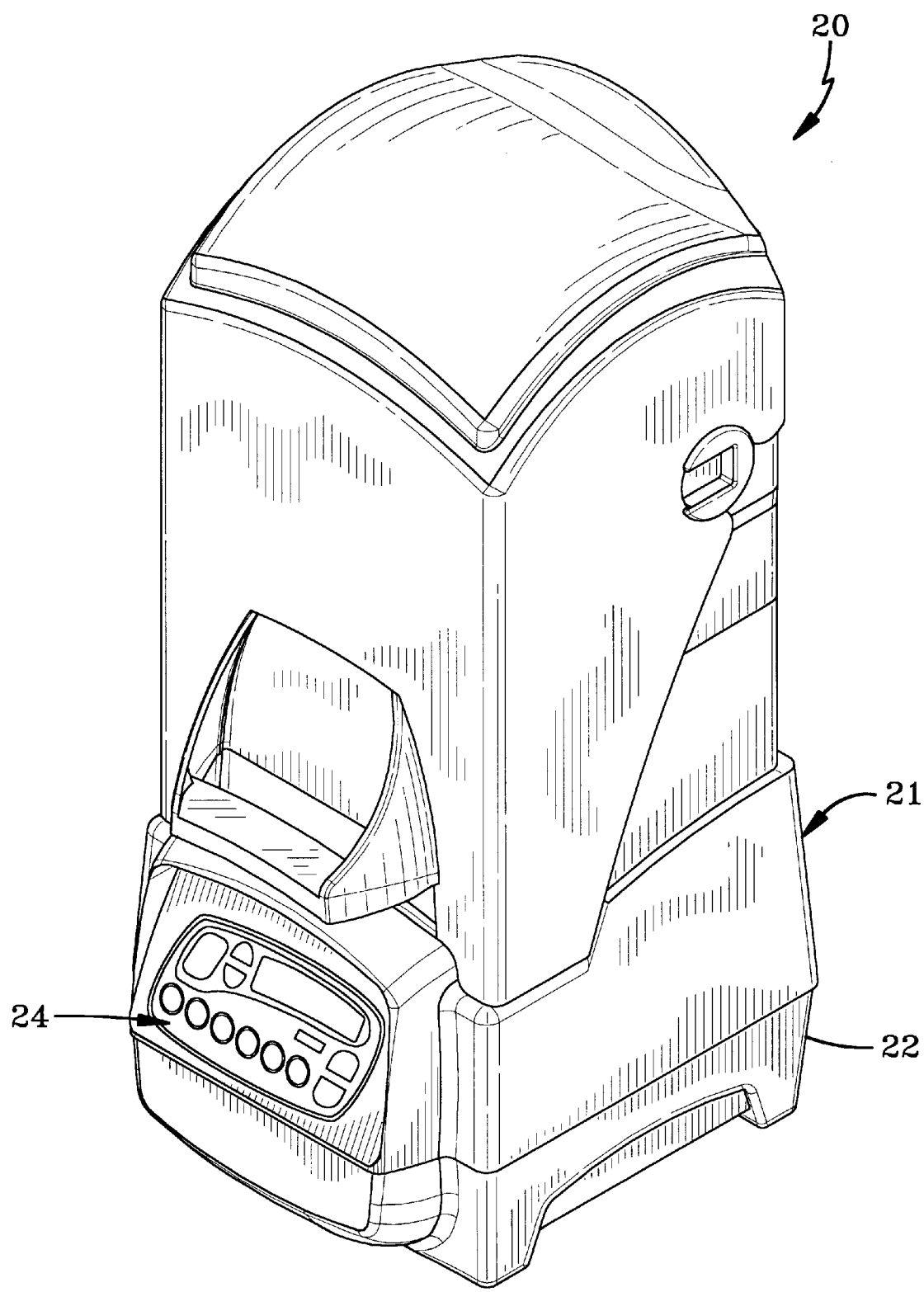
FIG. 1 is a perspective view of an exemplary blender in accordance with the present invention.
Figure 7:
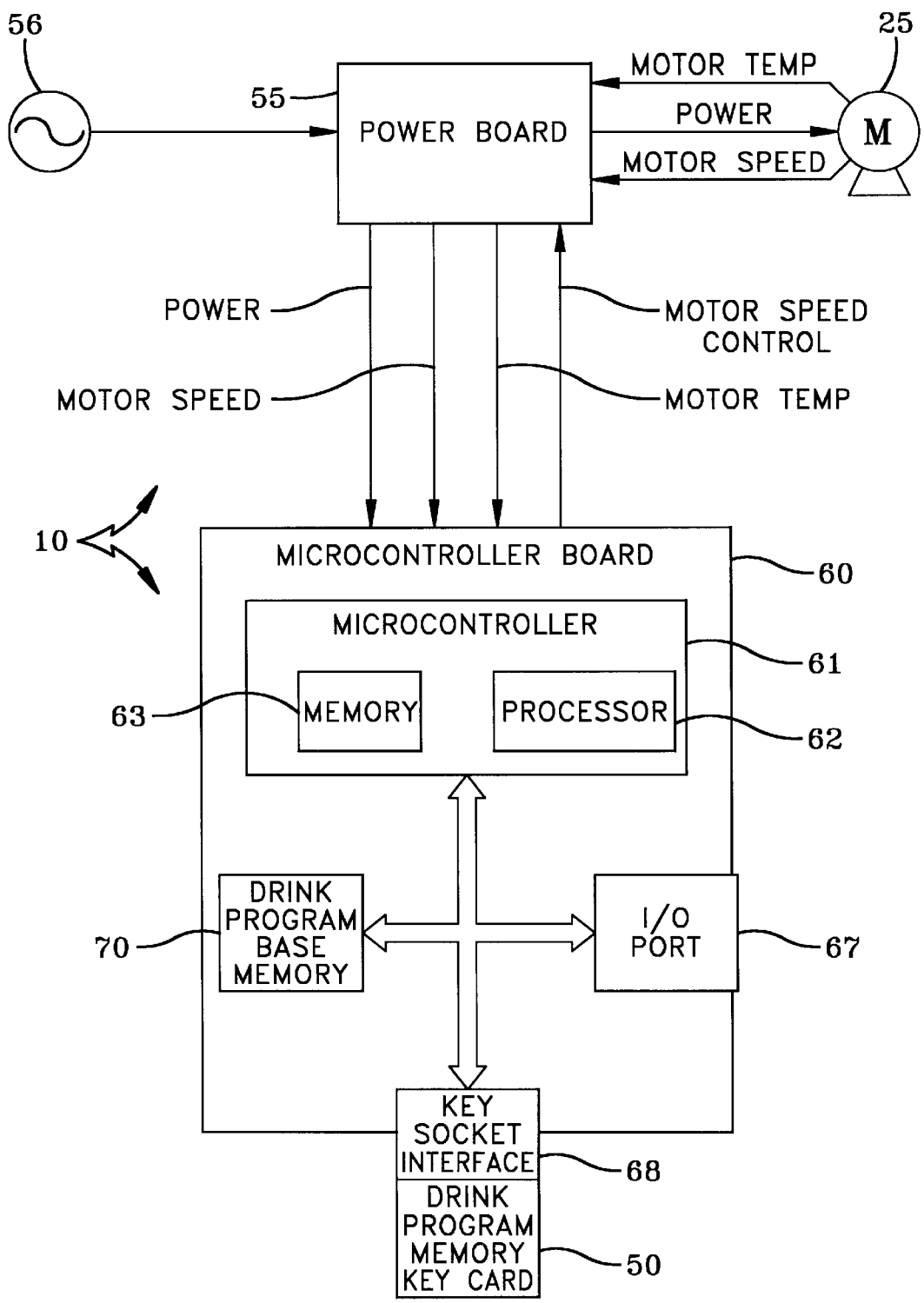
FIG. 7 is a block diagram of an exemplary blender control in accordance with the present invention, and includes a diagrammatic presentation of an exemplary blender motor.

An exemplary blender control in accordance with the present invention is indicated generally by the numeral 10 in FIG. 7, and may work with a variety of food and drink blenders. One such blender is shown in perspective in FIG. 1, and is indicated generally by the numeral 20. Blender 20 includes a housing 21 having a lower housing member 22, a user interface and display 24, and a blending assembly including a motor 25 (seen in FIG. 7).

Figure 2:
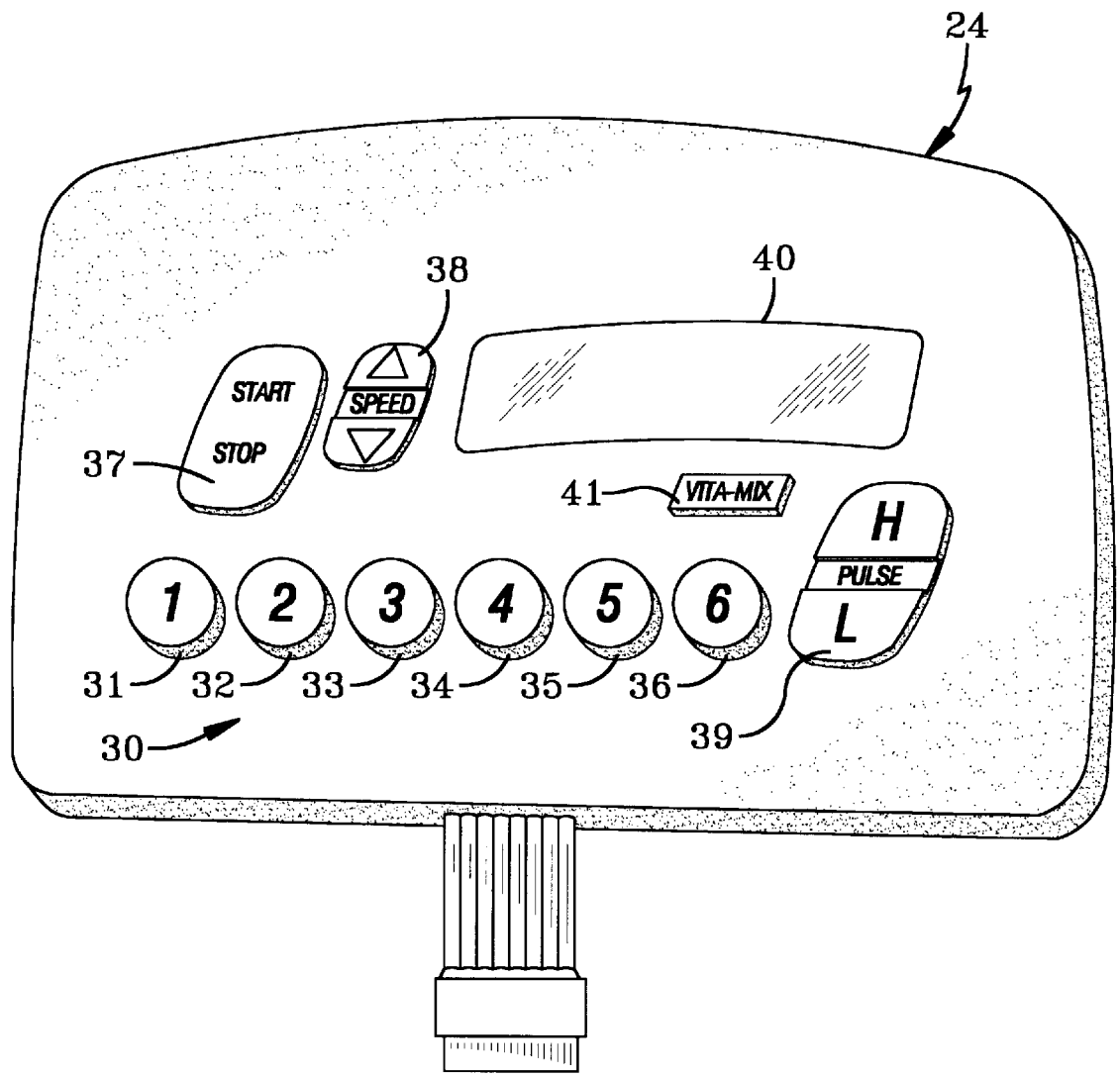
FIG. 2 is a front view of the exemplary user interface and display of the blender shown in FIG. 1, depicting six numbered buttons for the selection of drink programs stored in blender memory.

User interface and display 24, best shown in FIG. 2, includes a plurality of user input pushbuttons (hereinafter referred to as "buttons") for the selection, modification and creation of drink programs stored in blender memory. These include a plurality of numbered momentary buttons 30 (individually referred to as buttons 31–36). User interface and display 24 further includes a start/stop button 37, a speed change button 38, a blender motor pulse button 39, a display 40 and a mode select button 41. Start/stop button 37, speed change button 38 and pulse button 39, allow manual control of blender motor 25 by the user, including starting, stopping, incremental speed increases and decreases, and high and low speed pulsing, all as is well known in the art. Display 40 may be any display capability of presentation of the desired messages, such as a two line, sixteen character vacuum fluorescent display. Mode select button 41 may be used to initiate a program routine for user entry of drink program characteristic modifications or creation of new drink programs, as further discussed hereinafter.

Figure 5:
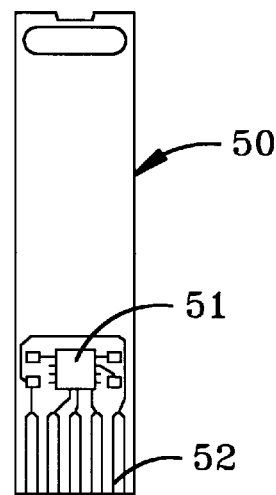
FIG. 5 is a top view of an exemplary drink program memory key card in accordance with the present invention.

FIG. 5 presents a top view of exemplary memory media such as drink program memory key card in accordance with the present invention, indicated generally by the numeral 50, and in operative association with blender 20. The exemplary key card 50 shown in FIG. 5 is a rectangular shaped printed circuit board large enough to carry a drink program key memory integrated circuit 51 (hereinafter referred to as "IC" 51, discussed further hereinafter) and be conveniently handled by a user, say about ⅝ inch (1.59 cm) by 2.5 inches (6.35 cm). Key card 50 includes on one narrow end a conventional edge connector 52 for engagement with, and electrically connecting the circuit on key card 50 to, a mating key socket interface discussed further hereinafter.

Figure 3:
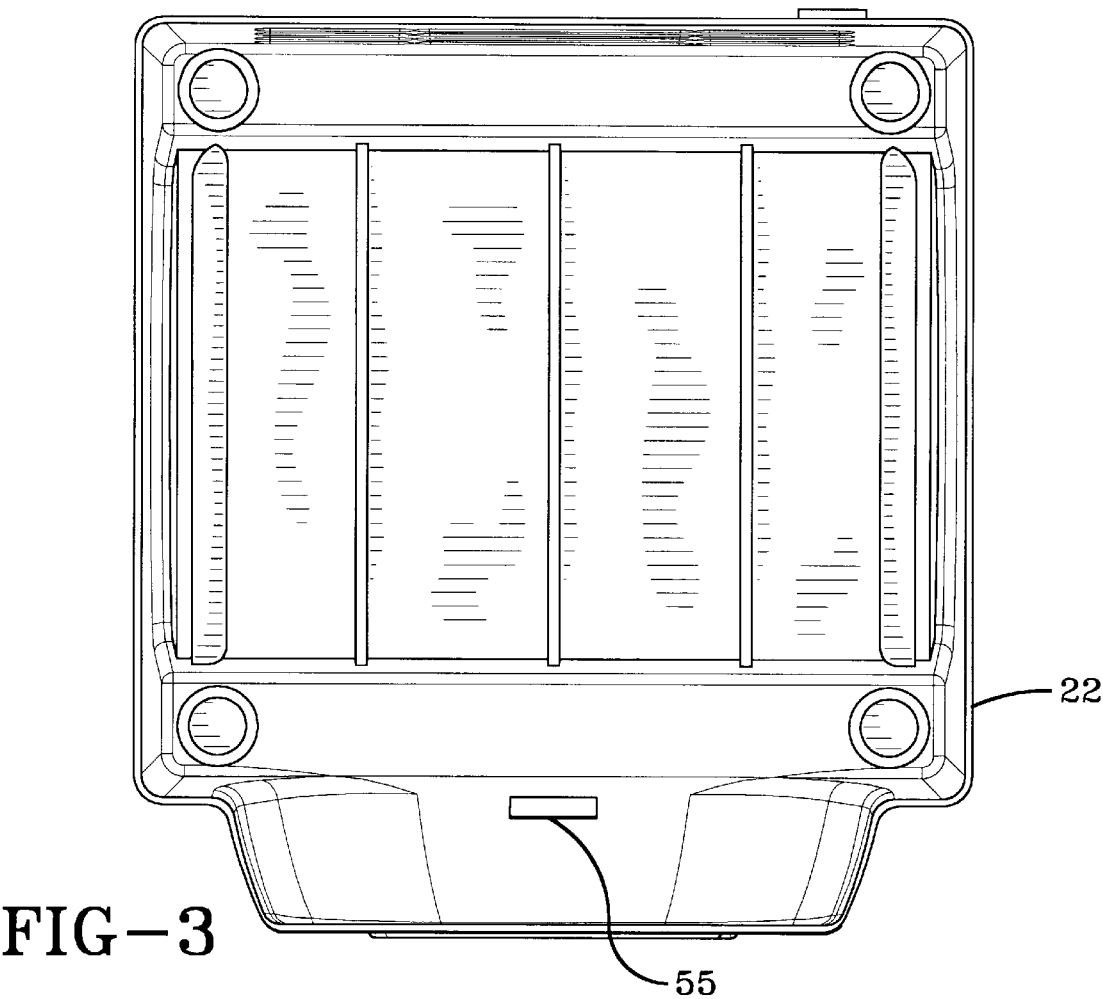
FIG. 3 is a bottom view of the blender lower housing, depicting a slot for the insertion of a drink program memory key card.
Figure 4:
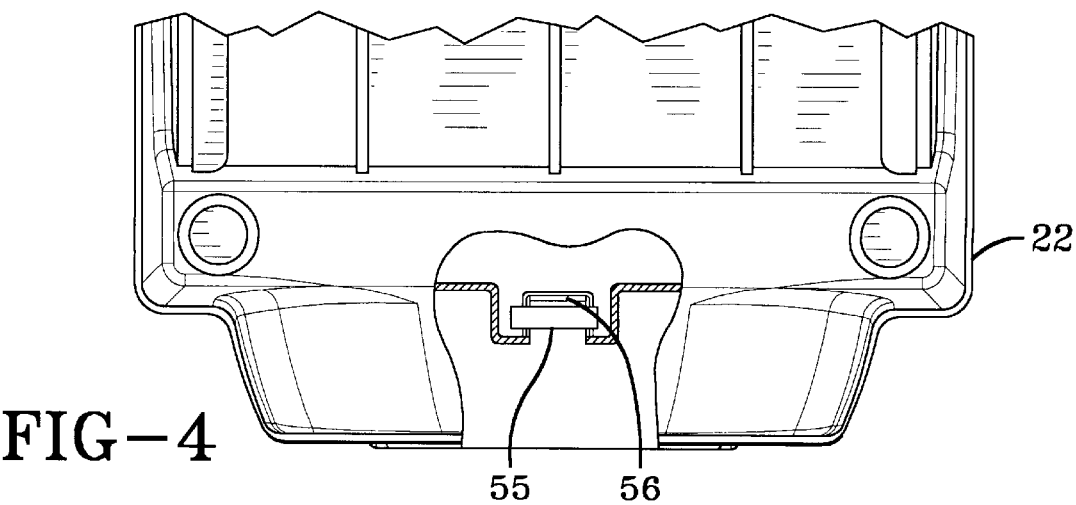
FIG. 4 is a partial bottom view of the blender lower housing illustrated in FIG. 3, depicting in break-away an interior section of the slot for insertion of a drink program memory key card.

As best seen in FIGS. 3 and 4, blender 20 includes integrally formed in its lower housing member 22 a slot 55 into which the user inserts key card 50 until its edge connector 52 engages and seats in the mating socket to be described further hereinafter. Slot 55 may include a ramp 56 or other mechanical feature as might occur to one of ordinary skill in the arts, that would facilitate the correct orientation and seating of edge connector 52 to its mating socket.

Figure 6:
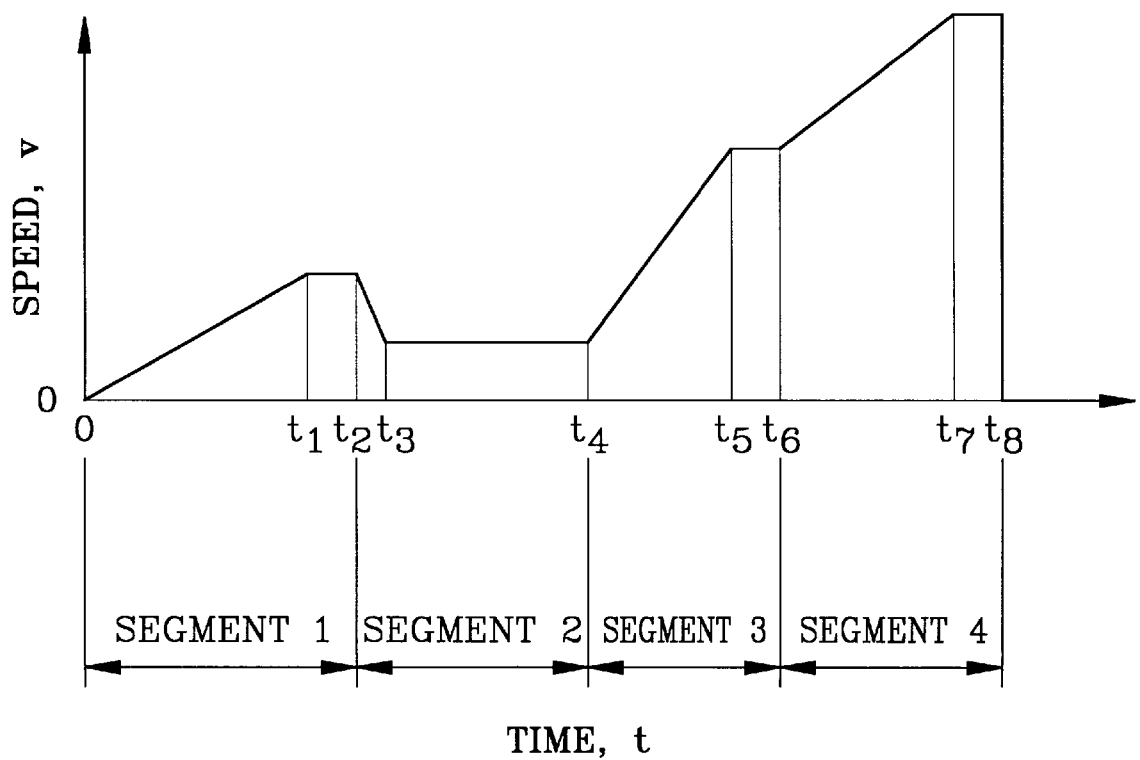
FIG. 6 is a graph of blender motor speed verses time for an exemplary drink program having four operating segments each with different motor speeds, ramp rates and durations.

The present invention allows for storage and reprogramming of drink programs having a plurality of operating segments. FIG. 6 presents a graph of blender motor speed verses time for an exemplary drink program having four operating segments each with different, variable operating characteristics. The speed of blender motor 25 is increased from zero at time zero to some preselected first velocity at time $t_1$. Blender motor 25 operates at the first velocity until time $t_2$. The time interval from time zero to $t_2$ may be referred to as segment 1, and the rate at which the speed of blender motor 25 increases from time zero to time $t_1$ may be referred to as the segment 1 ramp rate. Ramp rates, target velocities, and operating durations are selected in a similar manner and shown for the remaining segments 2, 3 and 4 with time intervals $t_3$, $t_4$, $t_5$, $t_6$, $t_7$, and $t_8$.

Referring now to FIG. 7, exemplary blender control 10 can be seen to broadly include a power board 55 receiving power from a conventional power source 56 such as 60 Hz, 120 V, a microcontroller board 60 and the drink program memory key card 50 noted hereinbefore. Microcontroller board 60 includes a microcontroller 61 having a processor 62 and nonvolatile microcontroller memory 63, and communicates data and control information via bus 66 with an input/output (hereinafter referred to as "I/O") port 67, an edge connector key socket 68 for receiving and mating with drink program memory key card 50, and drink program base memory 70.

Power board 55 furnishes all required power to blender control 10 and blender motor 25. Power board 55 also receives signals a characteristic of which provides periodic information about the temperature and speed of blender motor 25 from a thermocouple or other thermal sensor, and a tachometer or other rotational velocity sensor in operative association with blender motor 25, and furnishes those signals to microcontroller board 60 and processor 62.

Microcontroller 61 may be any microcontroller whose processor 62 and memory 63 are suitable for blender control in accordance with the present invention. Memory 63 stores the blender control program described herein, and may also store a backup copy of an original or start drink program. I/O port 67 may be any conventional communication port to permit manufacturer communication with microcontroller 61 and the loading of the desired original or start drink program into microcontroller memory 63. Drink program base memory 70, resident in blender 20, may be any conventional, nonvolatile memory with sufficient capacity to store the desired drink program data. Key socket 68 may include a conventional current sensor whereby as soon it receives and mates with drink program memory key card 50, processor 62 is automatically alerted via interrupt or other means known to the skilled artisan.

Figure 8:
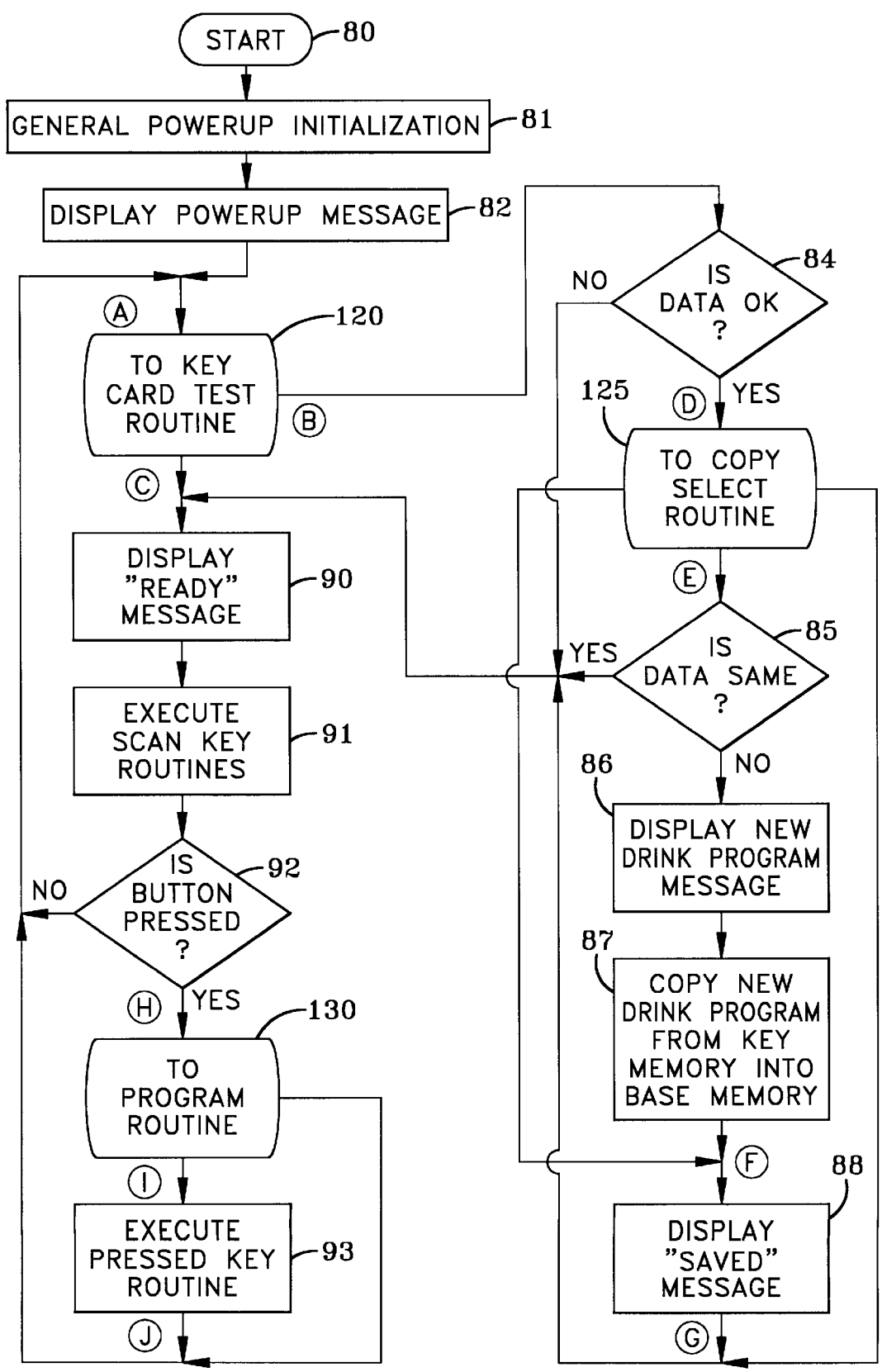
FIG. 8 is a top-level flow chart of an exemplary blender control program in accordance with the present invention.
Figure 9:
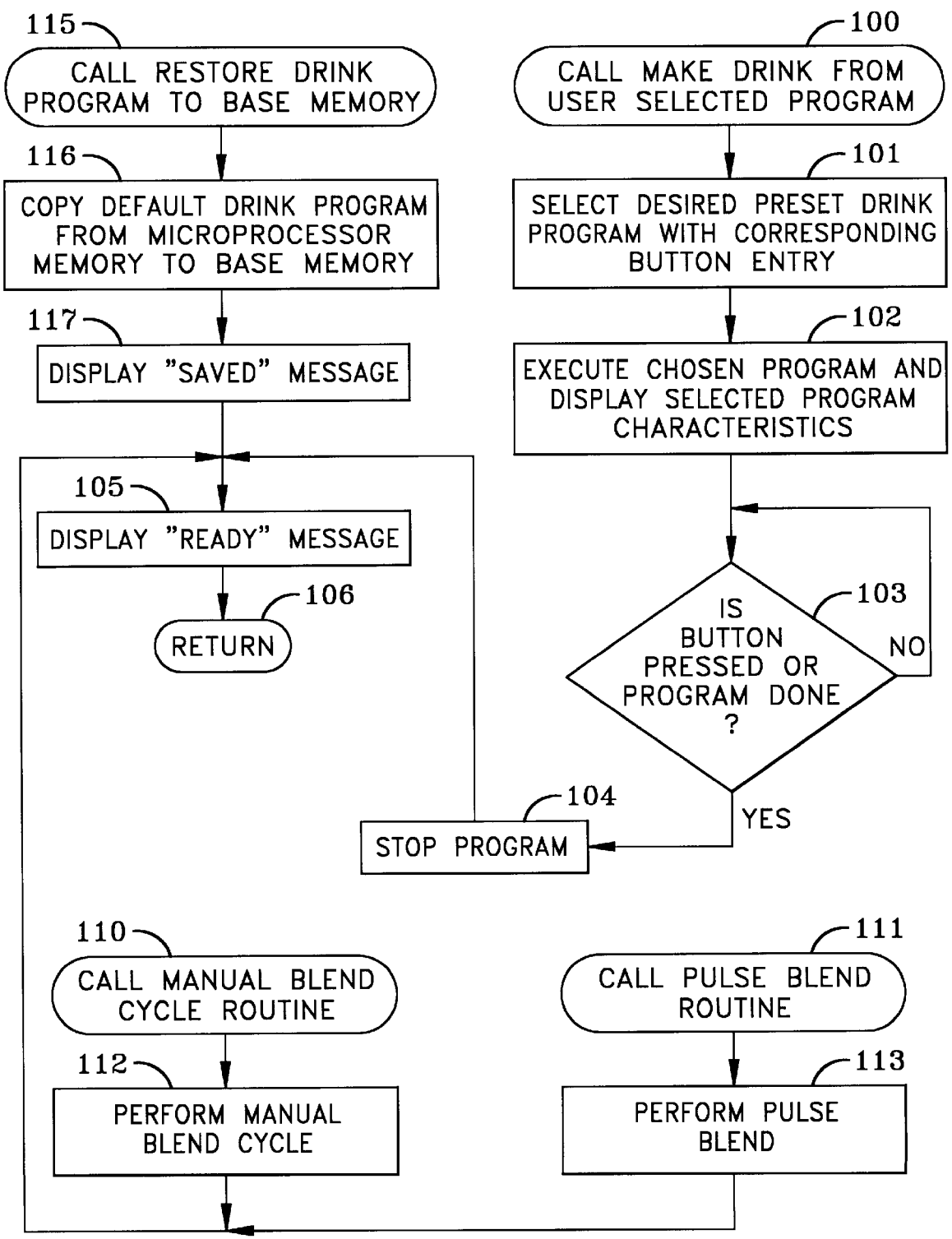
FIG. 9 is a top-level flow chart of four exemplary operating routines included within the exemplary blender control shown in FIG. 8.

FIGS. 8 and 9 present top-level flow charts for an exemplary algorithm executed by blender control 10 in accordance with the present invention. More particularly, FIG. 8 depicts an exemplary main control routine whose operation is begun at start 80 and first performs a general powerup initialization of hardware at step 81. This process may include, among other things, a clearing of display 40 and any volatile microcontroller operating memory, and a check and display of current blender motor 25 temperature. Initialization step 81 may further include reset of any software programming flags used for control purposes to their chosen default state. A default powerup message may be displayed in step 82, such as the manufacturer's name and the name and version of the drink program currently residing in base memory 70.

Figure 10:
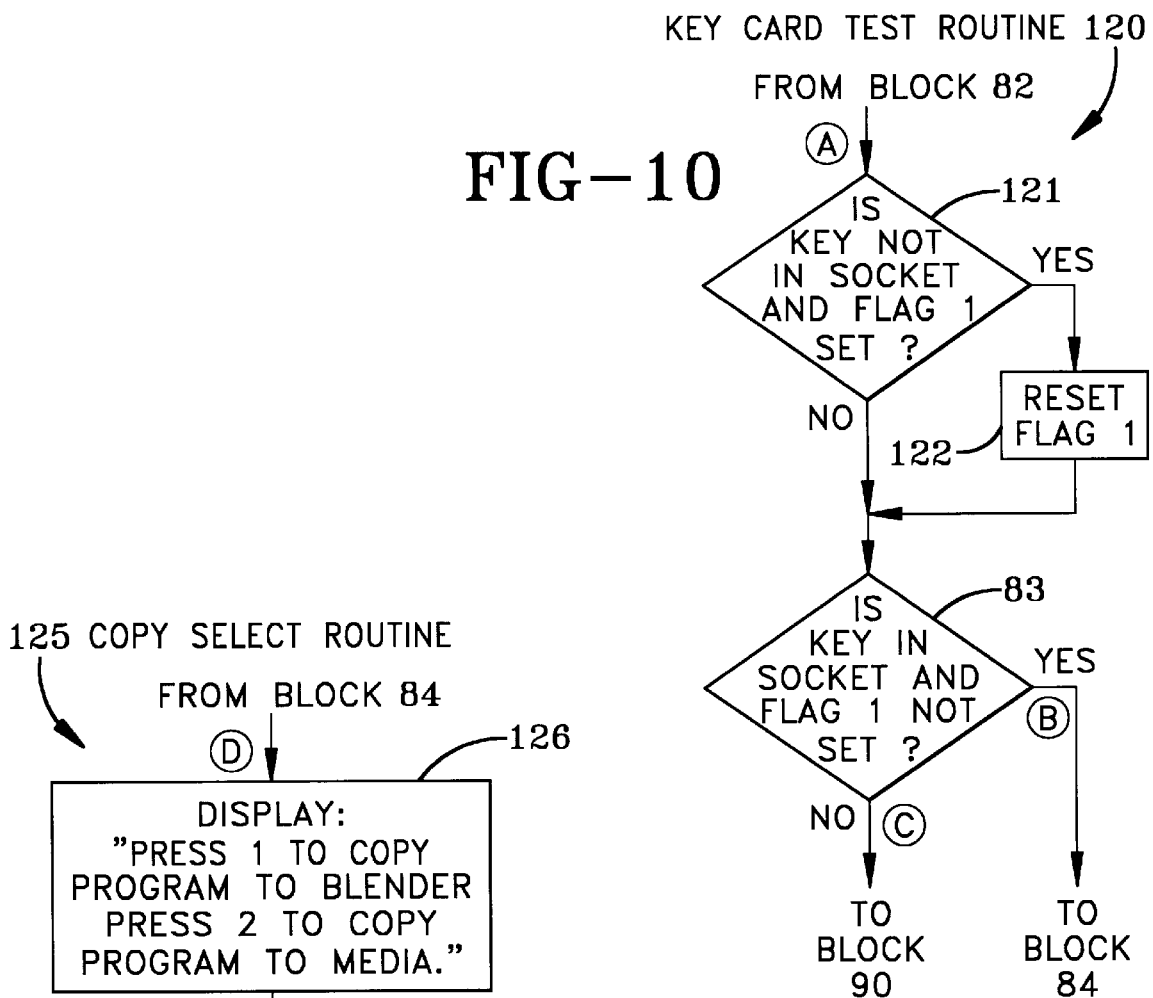
FIG. 10 is a top-level flow chart of an exemplary key card test routine included within the exemplary blender control program shown in FIG. 8.

Next the status of key socket 68 and any drink program memory card engaged therewith is examined in an exemplary key card test routine 120 shown in FIG. 10. (Circled letters presented in the flow chart figures designate points of interconnect between the figures.) More particularly, first the current loop connected to a conductor within key socket 68 is tested in step 121 to see if no drink program memory card 50 is mated therewith and if a first flag is set, signifying that a blend program has been copied between base memory 70 and the key card 50 currently engaged with key socket 68. This test insures that a user may, where desired, recopy a drink program between base memory 70 and multiple key cards 50, the latter of which may be used to distribute blend programs to other blenders. If both conditions are met, flag 1 is reset in step 122 before operation continues.

Figure 11:
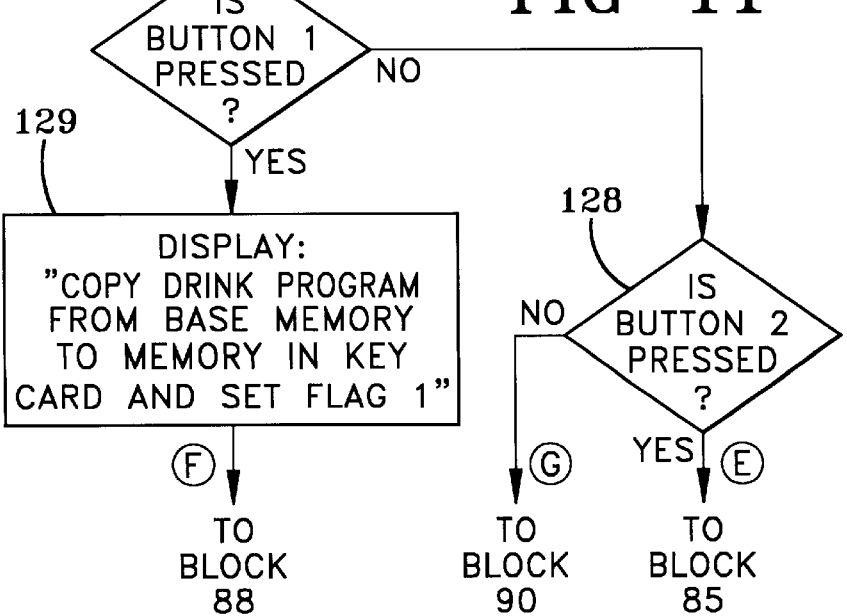
FIG. 11 is a top-level flow chart of an exemplary blend program copy select routine included within the exemplary blender control program shown in FIG. 8.
Figure 12:
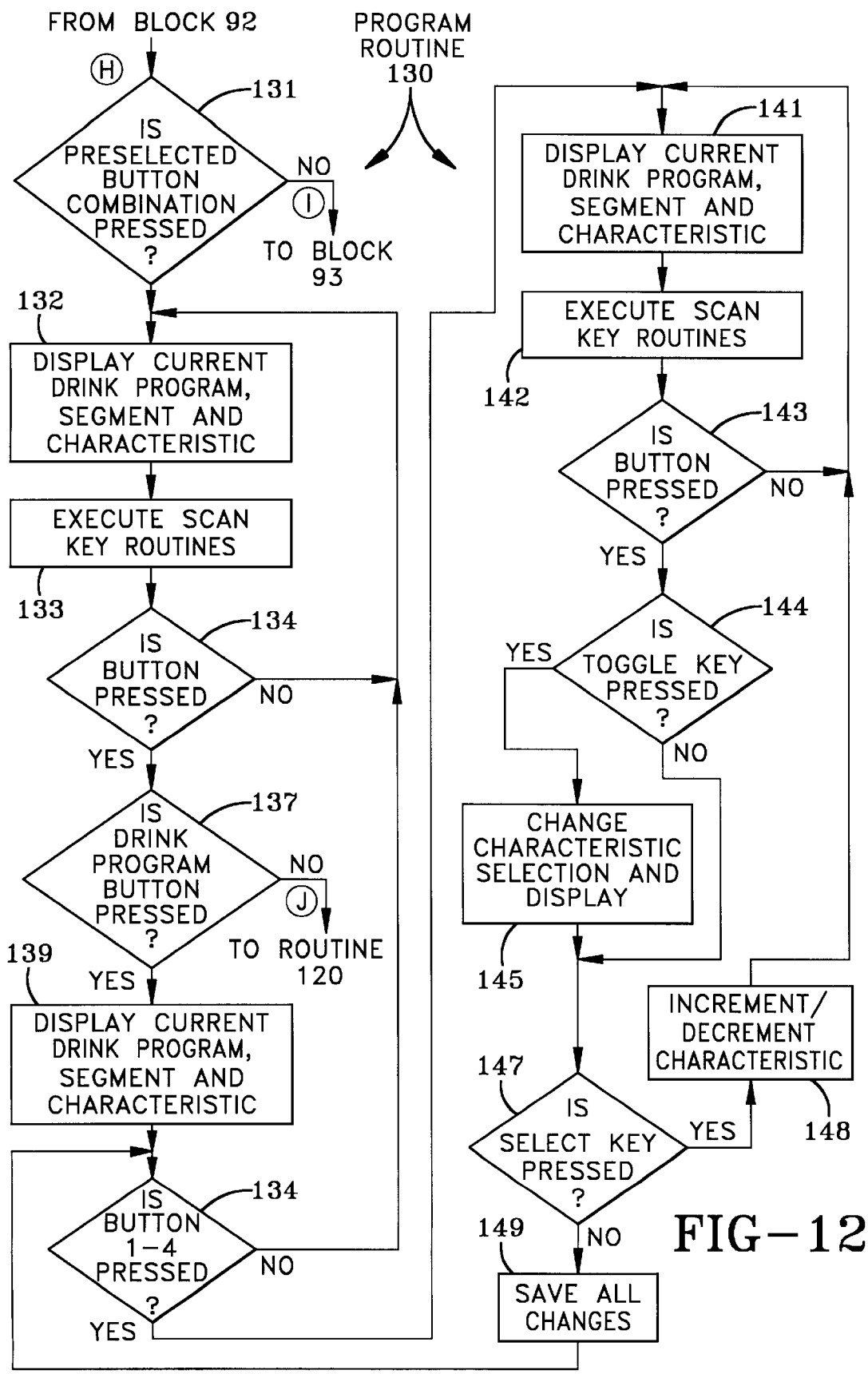
FIG. 12 is a top-level flow chart of an exemplary routine for modifying or selecting new blend program characteristics in blend programs. This routine is included within the exemplary blender control program shown in FIG. 8.

If both conditions are not met, or after flag one is reset, the current loop connected to a conductor within key socket 68 is tested in step 83 to see if drink program memory key card 50 is mated therewith and if a first flag is not set, signifying that a blend program has not been copied between base memory 70 and the key card currently engaged with key socket interface 68. If so, the contents of its memory are selectively sampled in block 84 using any of the techniques well known to the skilled artisan to determine if the drink program data is in good condition. If so, the user is given an opportunity to copy blend programs between the drink program memory in key card 50 and base memory 70 in blender 10. An exemplary copy select routine 125 by which this selection is made, is shown in FIG. 11.

Copy select routine 125 begins in step 126 with presentation on display 40 of a selection message such as "Press 1 to copy program to blender. Press 2 to copy program to media." In this instance if the user presses drink program 1 button 31, the blend program currently resident in base memory 70 will be copied to the drink program memory in key card 50, and if the user presses drink program 2 button 32, the copy will be in the opposite direction. Of course, any button may be preselected and programmed to enter these choices, and the preselected buttons tested in steps 127 and 128 to ascertain the user's choice.

In the present example, if drink program 1 button 31 is found in step 127 to have been pressed, then in step 129 the blend program currently resident in base memory 70 is copied to the drink program memory in key card 50, flag 1 is set and, as seen back in FIG. 8, a program "saved" message is presented on display 40 in step 88. If neither drink program buttons 31 or 32 are pressed, no further action is taken and subsequent steps are presented back in FIG. 8. If drink program 2 button 32 is found in step 128 to have been pressed, then (again as seen back in FIG. 8) the data may be further checked in step 85, again using any of the techniques well known to the skilled artisan to determine if the drink program data in key card 50 is the same as that currently in drink program base memory 70. If not, a new drink program message may be presented on display 40 as shown in block 86, the new drink program copied in step 87 from IC 51 in memory key card 50 to base memory 70, and, in block 88, a "saved" message displayed.

A "ready" message is displayed in step 90 if there is no key card 50 engaged with key socket 68 (step 83), if the drink program data content of IC 51 in memory key card 50 is corrupt (step 84), if the drink program in IC 51 is the same as the drink program in base memory 70 (step 85), if the user elects to not copy the drink program by not pressing any preselected button (step 128), or after a new drink program "saved" message has been displayed (step 88).

Once the "ready" message is displayed, a user can perform any appropriate blender operation, such as selection and execution of one of the drink programs by pressing the corresponding button 31–36, starting or stopping blender motor 25 operation with start/stop button 37, adjusting the speed of blender motor 25 with speed change button 38, or pulsing blender motor 25 with pulse button 39. The desired scan key routines are performed in step 91, and all buttons tested for actuation in step 92. If a button is pressed, the user is given an opportunity to modify any drink mix characteristic or the ice content of any drink including ice, and to create new blend programs or blend program segments. An exemplary program routine 130 by which such modifications or creations are made, is shown in FIG. 11. In this routine the user sequentially selects the desired drink program, drink program segment, characteristic and magnitude of change.

Program routine 130 begins in step 131 with a test to determine whether the correct combination of buttons preselected to initiate the program routine have been pressed in the preselected manner. Requiring the user activation of two or more buttons consecutively will help minimize the accidental or inadvertent entry into program routine 130, a desirable protection because this routine permanently alters blend programs and may not be suitable for operation by all users. Indeed, security may be further enhanced by inclusion of an additional button whose sole function is to allow entry into program routine 130 when pressed in sequence with other buttons having multiple functions. Mode select button 41 serves this function in the exemplary blender described herein.

If the correct combination of buttons preselected to initiate program routine 130 have not been pressed, but some other button has been pressed, then the selected routine is called and executed in step 93, as seen back in FIG. 8. If no button is found actuated in step 92, upon completion of the selected routine in step 93, or upon completion of program routine 130, the primary main control routine is repeated beginning with step 83.

Returning to program routine 130 shown in FIG. 11, display 40 presents in step 132 an identification of the current drink program, drink program segment, and characteristic, such as segment motor speed, time, ramp rate or ice amount. Default selections may be presented until the user makes other choices by execution of program routine 130. Next, scan key routines are executed in step 133 and the buttons tested in step 134, as was performed in steps 91 and 92, respectively. If no button has been pressed, the display is refreshed in step 132 and keys again tested until a button press is detected. If a button has been pressed, the button is tested in step 137 to ascertain whether it was one of the drink program buttons, signifying a user selection of a blend program to be modified or replaced. If not, then the user does not wish to perform a program change, and the primary main control routine is repeated beginning with key card test routine 120.

Once a drink program button has been found to have been pressed in step 137, display 40 is refreshed and presents in step 139 an identification of the current drink program, drink program segment, and characteristic. Having chosen the drink program to be modified, the user next selects a drink program segment. Buttons 31–36 may be preselected to correspond to the segments in a particular drink program. Using the example of FIG. 6, there are four segments which may be chosen by pressing drink program buttons 1–4, respectively. Thus, in step 140 drink program buttons 1–4 are tested. If none are pressed, operation returns to step 132. However, if one of those buttons are pressed, display 40 is again refreshed and presents in step 141 an identification of the current drink program, drink program segment, and characteristic.

Having chosen the drink program and drink program segment to be modified, the characteristic to be modified or added is next entered. Keys are scanned in steps 142 and button presses tested in step 143 as performed in corresponding steps 133 and 134. A toggle switch such as blender motor pulse button 39 may be conveniently used to scroll through and choose among the finite number of characteristics, and a test performed to see if that button has been pressed is performed in step 144. If so, in step 145 the characteristic to be modified is changed to the new selection and presented on display 40.

Next the magnitude and polarity of the characteristic change must be entered. Again, a toggle switch such as speed change button 38 may be conveniently used to "select" the desired characteristic by pushing up or down a number of times corresponding to the magnitude of the desired change or resulting characteristic. Button 39 is tested in block 147. If pressed, after a preselected timeout period the characteristic may be incremented or decremented (step 148) as called for by the user's actuation of button 39, display 40 refreshed in step 141 and monitoring of keys for further characteristic changes resumed. If, after a preselected timeout period button 38 is not pressed, the characteristic, segment and program changes may all be saved to the desired memory such as base memory 70 (step 149), and monitoring for further program changes in block 140 resumed.

Top-level flow charts for four exemplary operating routines included within the exemplary blender control shown in FIG. 8. are depicted in FIG. 9. Selection and execution of one of the drink programs (block 100) is initiated by pressing the corresponding button 31–36 in step 101. The chosen drink program is executed and selected program characteristics such as current motor speed and remaining time are displayed in step 102. While the drink program is executing in block 103 a check is repeatedly made to determine if the user has selected another button to override the remainder of the drink program. If so, the drink program is stopped in step 104. Thereafter, and when the drink program is finished, the "ready" message is displayed in step 105, and program execution returns (block 106) to the main program.

The user may also elect to perform a manual blend cycle or a pulse blend cycle by pressing the appropriate user interface 24 button. In those events, the corresponding routine is respectively called in steps 110 and 111, and performed in steps 112 and 113. The user may also elect to restore the default drink program from microcontroller memory 63 to drink program base memory 70, again by pressing the appropriate user interface 24 button. In that event, the corresponding routine is called in step 115, and the copy performed in step 116 followed by the display of a "saved" message in step 117.

Several variations and modifications should now be evident to or understood by the skilled artisan. For example, a drink program may have as few as one or as many segments as is required for production of the drink for which the program was created. Also, in the embodiment of the programmed blender control 10 described herein, drink programs selected for execution by the user are in nonvolatile memory on microcomputer board 60. However, while not presently preferred, processor 62 may execute drink programs directly from a source external to microcontroller board 60, such as the drink program memory key card 50. In this instance microcontroller memory 63 and base memory 70 may be eliminated. Of course, if the external source becomes unavailable, blender 20 would operate only manually.

It will likewise be appreciated that the interface between microcontroller board 60 and the drink program memory may be made by any means, wired or wireless, capable of transferring the blend programs. Additional examples of suitable wired interfaces that could be employed instead of or in addition to an edge connector are an RJ-type telephonic connection or a fiber optic, optical connection. Infrared, radio frequency or other wireless interfaces also may be substituted for or added to key socket 68.

Inasmuch as the present invention is subject to variations, modifications and changes in detail, some of which have been expressly stated herein, it is intended that all matter described throughout this entire specification or shown in the accompanying drawings be interpreted as illustrative and not in a limiting sense. It should thus be evident that a device constructed according to the concept of the present invention, and reasonably equivalent thereto, will accomplish the objects of the present invention and otherwise substantially improve the art of programmable blenders.

What is claimed is:

1. A programmable blender for executing a blend program, comprising:
    a blending assembly for blending ingredients;
    memory including a first blend program having a plurality of operating segments with variable blend program operating characteristics;
    input means for user selection of a first operating characteristic to be modified and the modification magnitude; and, a processor receiving said blend program from said memory and said user selection from said input means, modifying said first operating characteristic in accordance with said user selection, and controlling operation of said blending assembly in accordance with said modified blend program.

2. A programmable blender, as set forth in claim 1, wherein said memory is nonvolatile and said processor saves said modified blend program to said memory.

3. A programmable blender as set forth in claim 1, wherein said memory includes a plurality of blend programs, said input means includes input means for user selection of a blend program stored in memory, and said processor receives said selected blend program.

4. A programmable blender, as set forth in claim 3, wherein said input means includes input means for user selection of a blend program stored in memory having said first operating characteristic.

5. A programmable blender, as set forth in claim 3, wherein a first operating segment includes said operating characteristic to be changed, and said input means includes input means for user selection of said first operating segment.

6. A programmable blender, as set forth in claim 5, wherein said input means includes a plurality of pushbuttons.

7. A programmable blender, as set forth in claim 6, wherein said input means further includes a first pushbutton and a second pushbutton, said processor testing for user activation of said first pushbutton and said second pushbutton in a preselected manner prior to user selection of said first operating characteristic.

8. A programmable blender, as set forth in claim 7, further including a display presenting said first blend program, said first operating segment and said operating characteristic.

9. A blender for executing a blend program, comprising:

a blending assembly for blending ingredients;

a first memory resident in the blender for storing a blend program;

a second memory in operative association with the blender for storing said blend program; and, a processor resident in the blender receiving said blend program and selectively copying said blend program from said first memory to said second memory and from said second memory to said first memory.

10. A blender, as set forth in claim 9, further including input means for user selection of the direction said blend program is to be copied between said first memory and said second memory, said processor receiving said user selection from said input means and copying said blend program in accordance with said user selection.

11. A blender, as set forth in claim 10, wherein said second memory is a memory media for distribution of said blend program to another blender.

12. A programmable blender for executing a blend program, comprising:

a blending assembly for blending ingredients;

a first memory resident in the blender for storing a blend program;

a second memory in operative association with the blender for storing said blend program, one of said first memory and said second memory including a first blend program having a plurality of operating segments with variable blend program operating characteristics;

input means for user selection of a first operating characteristic to be modified and the modification magnitudes; and, a processor resident in the blender receiving said first blend program from one of said first memory and said second memory and receiving said user selection from said input means, modifying said first operating characteristic in accordance with said user selection, selectively copying said blend program from said first memory to said second memory and from said second memory to said first memory, and controlling operation of said blending assembly in accordance with said modified blend program.

13. A programmable blender, as set forth in claim 12, wherein said memory is nonvolatile and said processor saves said modified blend program to said memory.

14. A programmable blender, as set forth in claim 12, wherein said memory includes a plurality of blend programs, said input means includes input means for user selection of a blend program stored in memory, and said processor receives said selected blend program.

15. A programmable blender, as set forth in claim 14, wherein said input means includes input means for user selection of a blend program stored in memory having said first operating characteristic.

16. A programmable blender, as set forth in claim 14, wherein a first operating segment includes said operating characteristic to be changed, and said input means includes input means for user selection of said first operating segment.

17. A programmable blender, as set forth in claim 16, wherein said input means includes a plurality of pushbuttons.

18. A programmable blender, as set forth in claim 17, wherein said input means further includes a first pushbutton and a second pushbutton, said processor testing for user activation of said first pushbutton and said second pushbutton in a preselected manner prior to user selection of said first operating characteristic.

19. A programmable blender, as set forth in claim 18, further including a display presenting said first blend program, said first operating segment and said operating characteristic.

20. A programmable blender, as set forth in claim 12, further including input means for user selection of the direction said blend program is to be copied between said first memory and said second memory, said processor receiving said user selection from said input means and copying said blend program in accordance with said user selection.

21. A programmable blender, as set forth in claim 20, wherein said second memory is a memory media for distribution of said blend program to another blender.

* * * * *